United States Patent [19]
Quaile et al.

[11] 3,922,041
[45] Nov. 25, 1975

[54] ELASTIC PIVOT BEARINGS

[75] Inventors: Henry Quaile; Paul Piguet, both of La Chaux de Fonds, Switzerland

[73] Assignee: Portescap, La Chaux de Fonds, Switzerland

[22] Filed: Jan. 29, 1973

[21] Appl. No.: 327,645

Related U.S. Application Data
[62] Division of Ser. No. 155,580, June 22, 1971.

[30] Foreign Application Priority Data
June 25, 1970 Switzerland.......................... 9626/70
July 6, 1970 Switzerland........................ 10177/70

[52] U.S. Cl.................................. 58/140 A; 308/2 A
[51] Int. Cl............................................. F16c 23/00
[58] Field of Search....... 58/140 R, 140 A; 308/2 R, 308/26

[56] References Cited
UNITED STATES PATENTS

| | | | |
|---|---|---|---|
| 1,440,059 | 12/1922 | Colomb............... | 58/140 R |
| 1,642,102 | 9/1927 | Colomb............... | 58/140 R |
| 2,938,328 | 5/1960 | Derr.................... | 58/140 A |
| 2,956,394 | 10/1960 | Dubois................ | 58/140 R |
| 3,306,027 | 2/1967 | Schneider........... | 58/140 A |
| 3,397,531 | 8/1968 | Dubois................ | 58/140 R |
| 3,590,575 | 7/1971 | Eckenrode........... | 58/140 A |

FOREIGN PATENTS OR APPLICATIONS
| | | | |
|---|---|---|---|
| 1,341,341 | 9/1963 | Switzerland......................... | 308/26 |
| 244,883 | 6/1947 | Switzerland...................... | 58/140 A |
| 149,141 | 8/1931 | Switzerland...................... | 58/140 A |
| 156,949 | 11/1932 | Switzerland...................... | 58/140 A |
| 293,181 | 12/1953 | Switzerland...................... | 58/140 A |

*Primary Examiner*—Charles J. Myhre
*Assistant Examiner*—R. H. Lazarus
*Attorney, Agent, or Firm*—Arthur V. Smith; Pasquale A. Razzano

[57] ABSTRACT

A bearing for use in a bearing housing of a precision instrument has a central zone formed of a self-lubricating plastic material and an aperture therein for receiving the end of a shaft. Means is provided surrounding the central zone for elastically securing the bearing member to the housing whereby limited movement of the central zone with respect to the housing is permitted to dampen shocks to which the housing and shaft may be subjected. In one embodiment of the invention the means for securing the central zone of the bearing comprises a separate mounting member having the self-lubricating plastic central zone embedded therein. In another embodiment, the entire bearing is formed as a one piece member of self-lubricating plastic material and has at least one hollow space therein of predetermined configuration selected to provide a desired elasticity in the mounting member in both axial and radial directions with respect to the shaft to permit the desired limited movement of the central zone.

7 Claims, 7 Drawing Figures

ELASTIC PIVOT BEARINGS

This is a division of application Ser. No. 155,580, filed June 22, 1971.

This invention relates to a plastic pivot bearing for precision instruments and in particular to plastic pivot bearings for watches and clocks.

In previously proposed elastic pivot bearings of the above type, the elastic bearing member was formed in the shape of a disc which is provided at its center with a recess to receive the end of pivot shaft and has the edge portion thereof secured to the bearing housing. The elasticity of such a bearing member is determined essentially by the shape of the disc forming the bearing and the plastic which is utilized to make it. Since the outer shape of the bearing disc is determined for all practical purposes by the configuration of the bearing housing, the possibilities of varying the elasticity of such bearings are very limited. In addition, it is desirable to select the plastic material of the bearing member to be of the self-lubricating type in order to utilize the essential advantage of a plastic bearing, namely the avoidance of the requirement for oiling the bearings. When selecting the plastic therefore, it is necessary simultaneously to satisfy two requirements: first, the desired elasticity must be obtained and second, a low coefficient of friction must simultaneously be obtained. These two requirements frequently prevent the achievement of optimum desired operating conditions for the bearing.

Accordingly, it is an object of the present invention to accurately establish the elasticity of a plastic pivot bearing in accordance with predetermined operational requirements.

It is another object of the present invention to provide optimum elasticity and minimal coefficient of friction in a plastic pivot bearing assembly.

In accordance with an aspect of the present invention, a bearing is provided for use in a bearing housing of a precision instrument such as a watch. The bearing has a central zone formed of a self-lubricating plastic material with an aperture therein for receiving the end of a shaft. Means are provided for elastically securing the central bearing zone to the housing so that limited movement of the central zone with respect to the housing is permitted to dampen shocks to which the housing and shaft may be subjected. In one embodiment of the invention mounting member is formed of an elastic material of different composition than the central zone, with the mounting member having the central bearing zone embedded therein. The central bearing zone has a predetermined cross-sectional configuration selected in accordance with the desired dampening characteristics to be produced by the elastic mounting member to provide the desired elasticity in the member in both axial and radial directions with respect to the shaft. In another embodiment of the invention the bearing member is formed of a one piece unit of self-lubricating plastic material with the mounting zone surrounding the central zone and defining the elastic mounting means. The mounting zone in this embodiment has at least one hollow space therein of predetermined configuration selected to provide the desired elasticity such that the above-mentioned limited movement of the central zone is permitted.

By both of these constructions, it is seen that the known advantages of plastic bearings, in particular, their simplicity and economy of manufacture are retained.

The above, and other objects, features and advantages of this invention will be apparent in the following detailed description of illustrative embodiments thereof which are to be read in connection with the accompanying drawings wherein.

Figure 1:
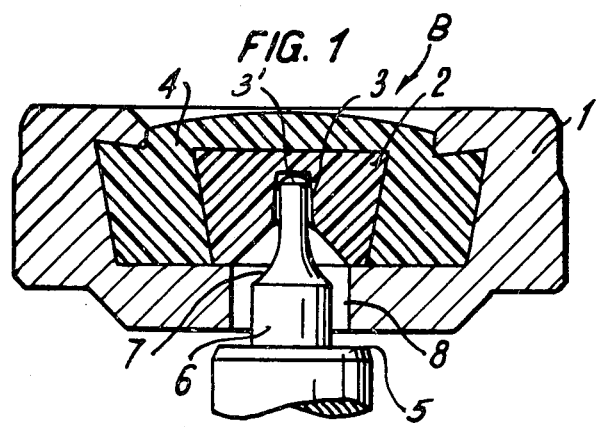
FIG. 1 is a sectional view of a plastic bearing member mounted in a bearing housing in accordance with one embodiment of the present invention.

Referring to the drawing in detail, and initially to FIG. 1 thereof, it will be seen that a bearing B, embodying the present invention, as shown therein, is mounted in a metal bearing housing 1, such as may be used in a watch or other precision instrument.

Bearing B has a central bearing zone or part 2 formed of a self-lubricating plastic material having a very low coefficient of friction and has an aperture 3 therein which is adapted to frictionally receive the stem 3' of a pivot shaft. Central bearing member 2 is embedded in a mounting member 4 formed of an elastic plastic material, selected in accordance with its elasticity so that when combined with a bearing member 2 of a given shape, the desired dampening of movement of the pivot 3 is obtained in case a blow or other force is exerted on the shaft or arbor.

To manufacture the bearing illustrated in FIG. 1, the central bearing zone 2 is first cast to the shape illustrated and then mounted in bearing housing 1 in position to receive the shaft stem 3'. The elastic part 4 is then produced by casting the elastic material directly into the bearing housing 1 about the central part 2.

The shape of bearing member 2 is so selected that this part is securely anchored in the elastic part 4, by form locking, and thus dampening of this part with respect to the bearing housing 1 is achieved by the elastic member 4. Since the shape of the elastic mounting member 4, for a given outer shape of the bearing member 2, is determined by the shape of the central member, elasticity of the composite bearing in axial and radial directions can be predetermined and established by the appropriate selection of central bearing part shape for any given plastic material used to form member 4.

The movement of pivot shaft stem 3' is limited in the axial direction by a stop 5 on the bearing shaft which will strike against the bottom surface of bearing housing 1 when moved in a vertical direction as seen in FIG. 1. Movement of the shaft 3 is limited in the radial direction by the shoulder 6 on the shaft which is connected by a rounded or filleted portion 7 with the smaller diameter stem portion 3'. Shoulder 6 will strike against the cylindrical opening 8 of the bearing housing and thereby limit radial movement of the shaft. These limitations of the movement of the pivot are so dimensioned that the deformation of the elastic bearing under the effect of a blow or shock does not exceed the elastic limit of the plastic material. Likewise, the larger dimensioned sections of the shaft, i.e., stop 5 and shoulder 6 absorb the blow at the limits of movement of the shaft so that the smaller diameter stem section 3 is not damaged.

Figure 2:
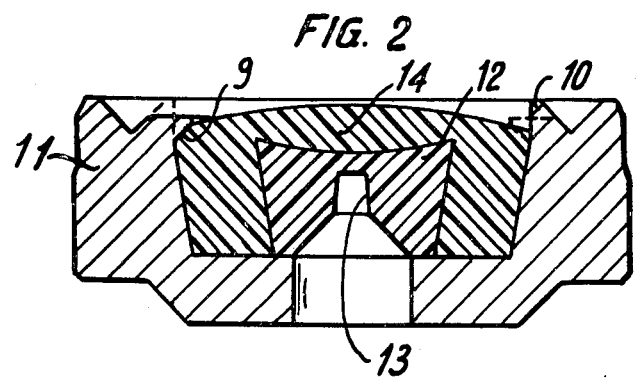
FIG. 2 is a sectional view similar to FIG. 1 of another embodiment of the present invention.

Another embodiment of the invention is illustrated in FIG. 2 wherein the elastic mounting member 14 is cast outside the bearing housing 1, with the center bearing part 12 embedded therein upon the casting of the edge portion. The combined bearing member 12, 14, is then inserted into the bearing housing in position for the aperture 13 in bearing zone 12 to receive the arbor of a shaft (not shown). The edge portion 9 of the bearing is gripped and held fast in the bearing housing 11 by crimping or otherwise deforming the edge 10 of the bearing housing. This crimping and gripping of the bearing by the edge 10 of the housing 11 may be used to secure the bearing in the housing even if mounting member 14 is produced by casting in place in the bearing housing itself. This type of mounting permits a firm anchoring of the elastic mounting member in the bearing housing and prevents relative movement of the elastic member as a whole with respect to the bearing housing, particularly in the event that clearance is produced between the housing 11 and the mounting member 14 as a result of a change in the surrounding conditions, e.g., unusual temperature conditions.

The embodiment of the invention as shown in FIGS. 1 and 2 has the advantage that the plastics which are best suited for each of the two functionally different parts i.e., the central bearing members 2, 12 and mounting members 4, 14 can be selected. Thus, for the central bearing part there is selected a self-lubricating plastic of extremely low coefficient of friction which has a high resistance to wear, such as for example, polyacetal or a polyamide. The part which surrounds central bearing member 2, i.e., members 4 and 14 is formed of a plastic having an elasticity, which upon deformation by a blow, guarantees precise return to its original position. Such plastics may be for example, polyethylene. Another advantage of this construction of the invention resides in the possibility of additionally controlling the elasticity of the bearing by a suitable shape of the center part so that more or less elastic material is provided in the composite bearing construction to vary the elasticity of the entire bearing assembly.

Figure 3:
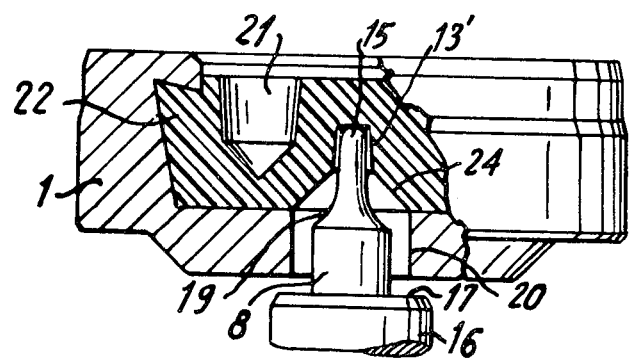
FIGS. 3, 4 and 5 are elevational views, partly in section, of one piece bearing members constructed in accordance with the present invention.

Another embodiment of the invention is illustrated is FIG. 3 wherein the metal bearing housing 1 is shown partly in section. In this embodiment, the bearing member 22 is formed as an integral one piece member which is cast in place in the bearing housing. Member 22 in this case consists of an elastic, self-lubricating plastic material, such as for example, polytetrafluourethylene or a polyamide. This member, in plan, has substantially the shape of a circular disc and has a central, slightly conical, recess 13' to receive the end 15 of the pivot shaft. The recess 13' tapers outwardly to a more steeply shaped conical section 24. The elasticity of member 22 permits movement of the pivot 5 in an axial or radial direction, with the stop 17 of the shaft 16 engaging the base of housing 1 when the shaft is moved in an axial direction and the shoulder 8, connected to shaft 15 by the rounded or filet portion 19, engaging the edge of opening 20 in housing 1 when the shaft is moved in a radial direction.

Member 22 is formed with several hollow spaces or openings 21 therein, which are distributed uniformly with respect to the axis of the bearing and the axis of shaft 16. These hollow spaces increase the elasticity of the bearing and in particular permit the selection of a predetermined elasticity of the bearing in both axial and radial directions. By the shape and arrangement of the spaces 21, the elasticity of the bearing member can be controlled within wide limits. The specific arrangement of the hollow spaces in bearing member 21 depends upon the number and shape selected to achieve the desired elasticity.

In lieu of a plurality of hollow spaces or apertures in bearing member 22, the bearing member may be provided with a single recess in the shape of a coaxial groove 32 formed therein. The shape of groove 32, in the same way as the shape of hollow spaces 21 of the embodiment of FIG. 3, is selected such that it can be produced by casting. In the particular embodiment illustrated it is seen that the groove opens upwardly towards the upper surface of bearing member 22. Alternatively, in lieu of a single annular groove, a plurality of concentric grooves may be provided which are coaxial with the central axis of the bearing and the axis of the shaft received in the bearing.

Figure 5:
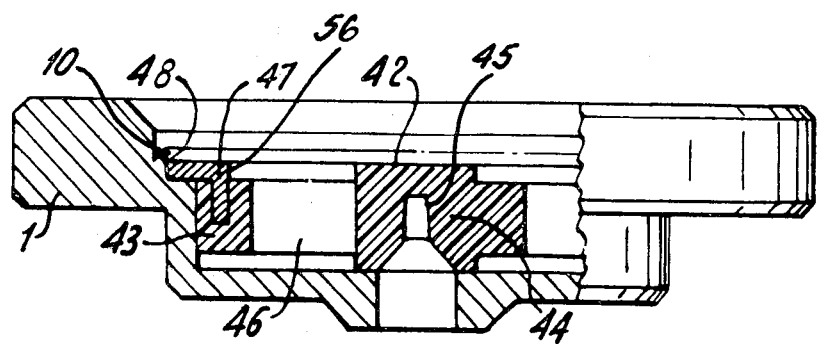
Figure 6:
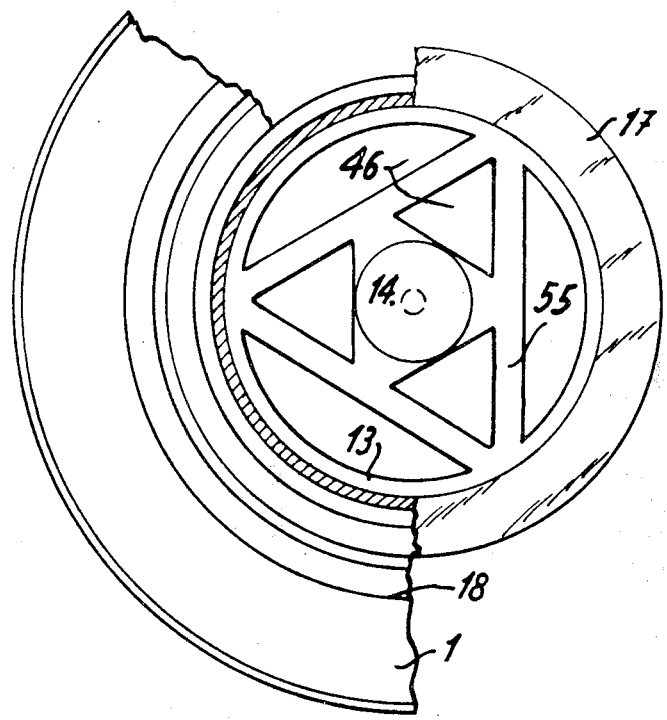
FIG. 6 is a plan view with parts broken away of the embodiment illustrated in FIG. 5.

Yet another embodiment of the present invention is illustrated in FIGS. 5 and 6 of the drawings wherein a bearing member 42 is provided which has a hub section 44 in which an aperture 45 is formed to receive the end of a pivot shaft. Member 42 also includes an annular edge portion 43, with the edge portion 43 and hub section 42 interconnected by arms 55 extending therebetween. Arms 55 are defined by a plurality of hollow spaces 46 cast in the member 42, which hollow spaces are symmetrical with respect to planes of symmetry through the axis of the bearing.

The elastic member 42 is provided with a metallic annular connecting member 56 which has a substantially right angular configuration in cross-section with one leg thereof embedded in the edge 43 of the bearing member, during the casting operation. The outer edge or horizontal leg 48 of ring 56 is secured to bearing housing 1 by crimping of the metal rim 10 thereover in a manner similar to that described with respect to the embodiment of FIG. 2. The shape of the elastic member of FIG. 6 permits the use of a relatively hard self-lubricating plastic which in certain cases, forms the most favorable material for the central bearing part 44, which is the actual place of shaft support. The arms 55, extending from rim 43 and central portion 44 provide the elasticity required in the mounting of central portion 44 which permits limited motion of the central bearing portion in order to absorb and dampen shocks to which the apparatus may be subjected.

Figure 4:
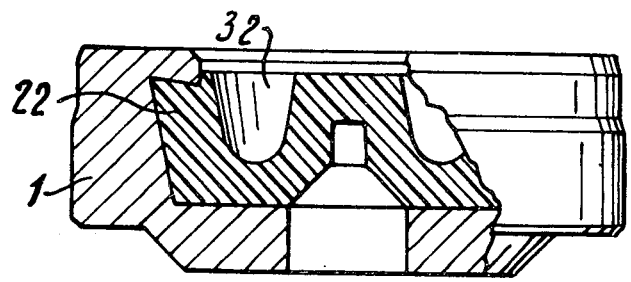
Figure 7:
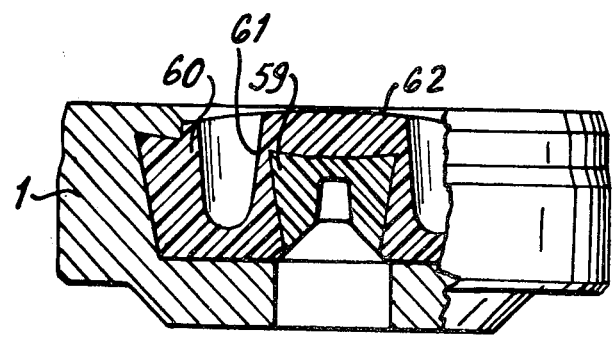
FIG. 7 is an elevational view, partly in section, of yet another embodiment of the present invention.

Yet another embodiment of the invention is illustrated in FIG. 7. In this embodiment a bearing member 62 is provided which is formed of two separate components 59 and 60, in a manner similar to the embodiments of FIGS. 1 and 2, with the central bearing part 19 formed of a self-lubricating plastic of extremely low coefficient of friction. The outer mounting part 60 is formed of a plastic having an elasticity which is suitable for the obtaining of the desired dampening effect, as described above. The central part 59 is cast first and then upon the casting of edge part 20 in the housing 1, the central bearing member 19 is embedded in the mounting part. As seen in the drawing, the mounting member 60 is provided with open hollow spaces 61 therein, which may also comprise an annular ring as in the embodiment of FIG. 4, to control and/or increase the elasticity of the mounting member 60.

The elastic bearing of the embodiment of FIG. 7 offers both a simple and effective solution for the problem of the design of a shock dampening bearing in a precision instrument. In particular it makes possible to adapt the elasticity of the plastic material forming the mounting member in different directions according to the particular use to which the instrument is to be placed, while at the same time retaining or improving the self-lubricating feature of a plastic bearing. Such a bearing can be used to particular advantages as shock dampening bearings for balance shafts on watches, which, as is well known, must satisfy extremely high shock effects during its life.

Typically, the pivots of the balance shafts of watches in which the bearings of the present invention are used, have a diameter of about 0.1 millimeter and fall from a height of 1 meter, as a result, when dropped a force of about 1 kilogram is exerted on the wall of the bearing hole. The dampening of such a bearing must be designed such that the pivot section of the shaft does not break under these conditions and that the bearing hole is not permanently deformed by the shock. In addition, the elastic member must return the bearing portion to its original configuration so that perfect centering of the balance shaft is again achieved. It has been found that by the construction of the bearings of the present invention these conditions for bearing constructions in precision watch instruments are satisfied.

Although illustrative embodiments of the present invention have been described herein with reference to the accompanying drawings, it is to be understood that the invention is not limited to those precise embodiments, and that various changes and modifications may be effected therein by one skilled in the art without departing from the scope or spirit of this invention.

What is claimed is:

1. A watch bearing comprising in combination, a metallic housing small enough to form a part of a bearing of a watch; an elastic one-piece bearing member having a central zone formed of a self-lubricating plastic material and having an aperture therein for receiving the end of a shaft, said bearing member including a mounting zone surrounding said central zone for elastically securing said central zone to said housing, said mounting zone having a plurality of hollow uniformly distributed spaces of predetermined configuration formed therein and extending completely through said bearing to define a plurality of flexible arms extending from said central zone; said arms extend angularly outwardly from said central zone along line which are angularly related to radii of said central zone; said arms, when viewed in plan, define a generally equilateral triangle connected at its apices to said mounting zone, and connected to said central zone at intermediate portions of the legs of said triangle, thereby to provide flexibility in said bearing.

2. The bearing as defined in claim 1 wherein three of said uniformly distributed spaces have a generally triangular configuration in plan and are located between said central zone and the legs of said triangle defined by said arms.

3. The bearing as defined in claim 2 wherein another three of said uniformly distributed spaces each have a configuration, in plan, corresponding to chord sections of a circle and are located between said arms and said mounting zone.

4. A bearing for use in a bearing housing of a precision instrument comprising, a one-piece elastic bearing unit formed of a self-lubricating material having a central bearing zone and a mounting zone surrounding said bearing zone, said bearing zone having an aperture therein for receiving the end of a shaft, and said mounting zone having a plurality of uniformly distributed hollow spaces of predetermined configuration formed therein and extending completely through said mounting zone to define a plurality of angularly extending flexible arms between a hub section containing said central bearing zone and an edge section by which said bearing is secured to said housing wherein the configuration of said spaces is selected to locate said arms in a configuration, in plan, corresponding substantially to an equilateral triangle superscribing said hub section and connected to said edge section at the apices of the triangle.

5. The bearing as defined in claim 4 wherein said hub section is connected to the legs of said triangle, as defined by said arms, at intermediate portions of said legs, thereby to provide radial flexibility in said bearing.

6. The bearing as defined in claim 5 wherein three of said uniformly distributed spaces have a generally triangular configuration in plan and are located between said hub section and the legs of said triangle defined by said arms.

7. The bearing as defined in claim 6 wherein another three of said uniformly distributed spaces each have a configuration, in plan, corresponding to chord sections of a circle and are located between said arms and said edge section.

* * * * *